Dec. 23, 1952     L. M. GOODMAN     2,622,837
HOSE SHUTOFF
Filed Oct. 16, 1946
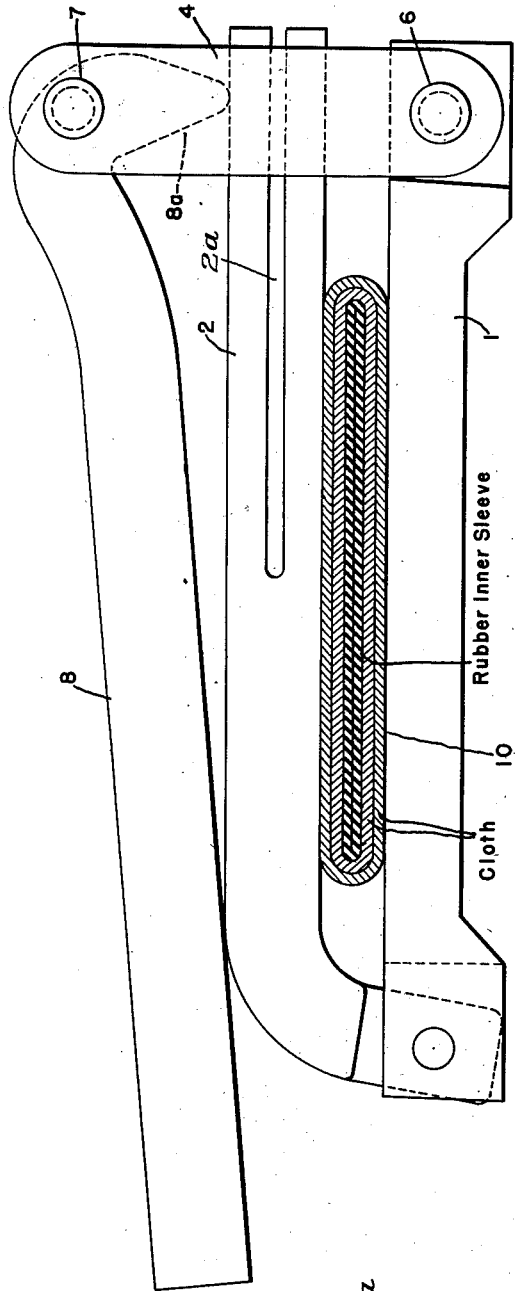
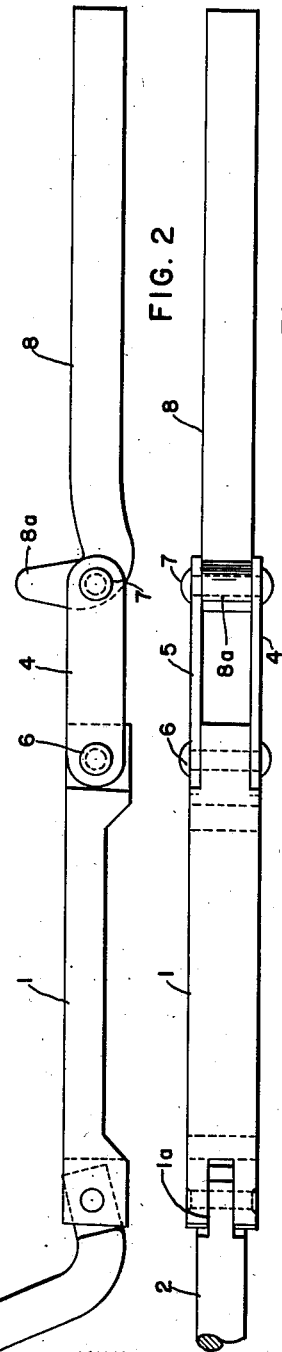
INVENTOR
Leo M. Goodman
BY
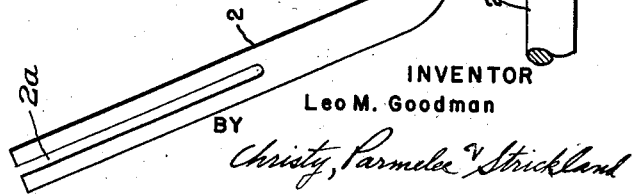
ATTORNEYS Patented Dec. 23, 1952

2,622,837

UNITED STATES PATENT OFFICE 2,622,837

HOSE SHUTOFF

Leo M. Goodman, Mayview, Pa.

Application October 16, 1946, Serial No. 703,640

1 Claim. (Cl. 251—5)

This invention relates to a clamp especially useful as a hose shut-off but which is also useful for other applications.

In the past, various types of clamps have been devised for use as shut-offs for fire hoses and the like, but these have generally been cumbersome and complicated in construction. While a cammed-lever type clamp has been used for this purpose, the various parts of the clamp are generally tied together so intricately as to make it impossible to quickly apply the clamp on or release it from a hose.

An object of my invention is to provide a novel clamp particularly useful as a hose shut-off and that is devoid of the above-named disadvantages of common types of clamps.

A more specific object of my invention is to provide a novel clamp or hose shut-off that is relatively simple in construction and that is very easily and quickly operated.

A still more specific object of my invention is to provide a novel clamp or hose shut-off whose parts are pivoted together in simple end-to-end relationship or string-like fashion so that the clamp can be, in effect, wrapped around the object to effect clamping.

Other objects and advantages of my invention will become apparent from a study of the following specification taken with the accompanying drawings wherein:

Fig. 1 shows a front view of a clamp or hose shut-off showing the parts in clamped position;

Fig. 2 is a side view of the clamp shown in Fig. 1 except that the clamp is in the open position, and Fig. 3 is a top or plan view of the clamp shown in Fig. 2.

Referring more particularly to the figures, numeral 1 denotes a base having a slot 1a at one end through which extends a reduced end of a pressure plate or clamping jaw 2, which reduced end is pivoted to the end portion of the base defining the slot 1a. Clamping jaw 2 is slotted at 2a. At the other end of base 1 there is pivotally connected a pair of links 4 and 5. The pivotal connection is made by a bolt 6 which extends through such end of the base and through the ends of the links. A similar bolt 7 is provided at the other end of the links to provide a pivotal connection for a cam lever or operating lever 3. The operating lever has a cam 8a at the pivoted end. As illustrated in the drawings, the slot 2a is parallel to the camming surface engaged by the cam 8a, and this feature provides resilience by which such camming surface may deflect under the action of the cam 8a.

The operation of the device is as follows: Assume that it is desired to clamp some object, for instance to shut off a hose, such as a fire hose. A fireman, after leaving a fire truck at a fire hydrant, screws the hose on a fire plug and may then apply a clamp to the hose and turn the water on full so that by the time the rest of the hose is laid and the hose men are ready, he can quickly release the clamp so that the full pressure of the water will flow through the hose immediately. It will be readily apparent that it is highly important that the clamping or unclamping operation be effected quickly.

The clamping operation is performed by starting out with the parts in the open position, that is, with the clamp opened up in string-like fashion. The base 1 is placed immediately underneath the fire hose 10, then the clamping body 2 is pivoted about base 1 so as to rest on top of hose 10. Following this, cam lever 8 is pulled upwardly so as to drag along with it the link 4 until link 4 assumes a vertical position, at which time lever 8 is turned about its pivot at its cammed end. This effects a cam action on top of the free end of the clamping body, thereby progressively forcing the body downwardly so as to squeeze the hose until its walls are completely collapsed, and thus stop the flow of water therethrough.

When the operating lever is moved downwardly to substantially a horizontal position or slightly past such position as shown in Fig. 1, the cam 8a thereof locks the parts in the clamped position so as to maintain the shut-off condition of the hose after the lever is released. Of course, to open the clamp, the reverse movement is effected, that is, first the operating lever is rotated in an opposite direction and following this, the clamping body is pivoted in an opposite direction from that of the clamping movement.

The above-described clamp, while intended primarily for use for a hose that is not under pressure, may also be used to temporarily and quickly cut off the flow of water through a charged hose. Likewise, the clamp may be used generally for purposes other than for hoses wherein a squeezing action is desired.

Thus it will be seen that I have provided a highly efficient and relatively inexpensive clamp or hose shut-off that is particularly useful for fire hoses, particularly since it is easily and very quickly operated as distinguished from more complicated general types of fire hose shut-offs whose parts are intricately tied together so as to make the clamping process a slow one and sometimes a very difficult one.

While I have illustrated and described certain specific embodiments of my invention, it will be understood that this is by way of illustration only and that various changes and modifications may be made within the contemplation of my invention and within the scope of the following claim.

I claim:

A hose clamp comprising a base having spaced pivots at opposite ends thereof, a clamping lever having one end connected to one of said pivots and its other end provided with a camming surface, a cam engageable with said surface for operating said clamping lever to apply a closing clamping force to a hose on said base between said pivots, and operating and mounting means for said cam comprising an actuating lever having said cam secured thereto for actuating thereby, a link connected to the other of said pivots, and a pivotal connection for said actuating lever with said link at a point spaced from said other pivot, said other end of said clamping lever having a slot parallel to said camming surface and extending radially toward the pivot to which it is connected so that said camming surface will resiliently deflect under the camming action of said cam.

LEO M. GOODMAN.

REFERENCES CITED

The following references are of record in the file of this patent:

UNITED STATES PATENTS

| Number | Name | Date |
| --- | --- | --- |
| 341,365 | Wilson | May 4, 1886 |
| 769,830 | Nehrbas | Sept. 13, 1904 |
| 1,055,552 | Payne | Mar. 11, 1913 |
| 1,505,428 | Richards | Aug. 19, 1924 |
| 1,694,474 | Lainer | Dec. 11, 1928 |
| 1,897,743 | Warner | Feb. 14, 1933 |
| 2,064,919 | Kellam | Dec. 22, 1936 |
| 2,167,952 | Jordan | Aug. 1, 1939 |
| 2,271,785 | Watkins | Feb. 3, 1942 |